(12) United States Patent
Hanna (10) Patent No.: US 8,103,909 B2
(45) Date of Patent: Jan. 24, 2012

(54) AUTOMATIC HARDWARE-BASED RECOVERY OF A COMPROMISED COMPUTER

(75) Inventor: Stephen R. Hanna, Bedford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 190 days.

(21) Appl. No.: 12/400,574

(22) Filed: Mar. 9, 2009

(65) Prior Publication Data

US 2010/0070800 A1    Mar. 18, 2010

Related U.S. Application Data

(60) Provisional application No. 61/096,949, filed on Sep. 15, 2008.

(51) Int. Cl.
*G06F 11/00* (2006.01)

(52) U.S. Cl. .................. 714/15; 714/10; 714/30; 713/2

(58) Field of Classification Search ............. 714/10, 714/15, 30, 38, 47, 48, 49, 38.1, 38.14, 47.1; 713/2; 726/21, 24
See application file for complete search history.

(56) References Cited

U.S. PATENT DOCUMENTS

| | | | | |
|---|---|---|---|---|
| 5,844,986 | A * | 12/1998 | Davis | 714/38 |
| 6,185,678 | B1 * | 2/2001 | Arbaugh et al. | 713/2 |
| 6,442,623 | B1 | 8/2002 | Kim | |
| 7,373,551 | B2 * | 5/2008 | Rothman et al. | 714/30 |
| 7,577,871 | B2 * | 8/2009 | Largman et al. | 714/38 |
| 7,664,984 | B2 * | 2/2010 | Wang et al. | 714/15 |
| 7,716,470 | B2 * | 5/2010 | Stillerman et al. | 726/21 |
| 2008/0270782 | A1 * | 10/2008 | Bone et al. | 713/2 |
| 2009/0172378 | A1 * | 7/2009 | Kazmierczak et al. | 713/2 |
| 2009/0198891 | A1 * | 8/2009 | Arimilli et al. | 711/118 |
| 2009/0249120 | A1 * | 10/2009 | Yao et al. | 714/15 |
| 2009/0276617 | A1 * | 11/2009 | Grell et al. | 713/2 |
| 2009/0327684 | A1 * | 12/2009 | Zimmer et al. | 713/2 |

OTHER PUBLICATIONS

TPM Main Part 1 Design Principles, Specification Version 1.2, Level 2 Revision 103, Jul. 9, 2007, 182 pgs.

* cited by examiner

*Primary Examiner* — Robert Beausoliel, Jr.
*Assistant Examiner* — Joseph D Manoskey
(74) *Attorney, Agent, or Firm* — Shumaker & Sieffert, P.A.

(57) ABSTRACT

In general, techniques are described for hardware-based detection and automatic restoration of a computing device from a compromised state. Moreover, the techniques provide for automatic, hardware-based restoration of selective software components from a trusted repository. The hardware-based detection and automatic restoration techniques may be integrated within a boot sequence of a computing device so as to efficiently and cleanly replace only any infected software component.

29 Claims, 6 Drawing Sheets

AUTOMATIC HARDWARE-BASED RECOVERY OF A COMPROMISED COMPUTER

This application claims the benefit of U.S. Provisional Application No. 61/096,949, filed Sep. 15, 2008, the entire content of which is incorporated herein by reference.

TECHNICAL FIELD

The invention relates to computing devices, and more particularly, to recovery of a computing device once compromised by malicious software.

BACKGROUND

Computing devices include one or more processors for executing software instructions present in the processor's operating memory. To provide flexibility and adaptability, many computing devices employ a staggered approach to loading software instructions. Under this approach, modular software components stored in persistent memory or storage devices are configured with instructions and parameters needed to load and initiate execution of additional modular software components, including the operating system. During the device startup operation, these module software components are referred to as "boot components" that execute in a "boot sequence" that culminates in the loading of all instructions into the operating memory that are necessary for device operation. Performing device startup in this manner permits divergent storage means for the various boot components. Moreover, certain necessary updates to the device can be accomplished by simple modifications to an individual booting component or parameters.

The capacity to update the boot components introduces vulnerabilities into the device. For instance, a virus, trojan, or other malicious software (or "malware") operating on the device may modify or replace any or all of the boot components in order to gain control of the device. Where the malware is successful, the device is said to be "compromised" or "infected."

Typically, upon detecting the device's compromised state, a user executes software on the device designed to identify and quarantine any infected software or data in an attempt to restore the device to its proper operating mode. In some instances, a compromised device may be unable to recover due to nature of the malicious software and the defensive measures erected by the infection. For instance, the malicious software may have modified the operating system so as to prevent an anti-virus program from executing a remedial routine capable of repairing or even detecting the modification. In another example, the malicious software may have modified a boot loader of the computing device so as prevent the operating system from loading altogether, thereby rendering the device inoperable. Where restoration is impossible, as in these examples, an administrator may be forced to reinstall and/or replace all of the boot components for the device by, for example, reformatting the device's hard drive and installing a clean version of the entire operating system and other system software components. This wholesale reinstallation is a time-consuming and expensive operation. Moreover, such wholesale reinstallation frequently results in the loss of user data and settings.

SUMMARY

In general, techniques are described for hardware-based detection and automatic restoration of a computing device from a compromised state. Moreover, the techniques provide for automatic, hardware-based restoration of selective software components from a trusted repository. The hardware-based detection and automatic restoration techniques may be integrated within a boot sequence of a computing device so as to efficiently and cleanly replace only any infected software component.

For example, auxiliary hardware separate from a main processor of a computing device requires an integrity verification for each boot component prior to execution of the boot component by the main processor. That is, prior to loading a boot component into the operating memory of the device processor, the auxiliary hardware performs an integrity check on the component in order to detect the presence of a malware infection. If the boot component manifests an infection or otherwise fails the integrity check, the auxiliary hardware replaces the component with a trusted version of the component obtained from a trusted source. This process continues so that the integrity of each software component of a boot sequence can be individually verified and, if compromised, individually replaced without requiring replacement of other, non-infected software components.

In one example, upon notification that a boot sequence has been initiated for the device, the auxiliary hardware within the computing device identifies a first boot component in the boot sequence (typically, a Basic Input/Output System "BIOS"). The auxiliary hardware calculates a cryptographic hash or other checksum of the first boot component. The auxiliary hardware then compares the calculated hash value with a trusted, acceptable hash value for the first boot component. If the calculated hash value is satisfactory, the auxiliary hardware permits the first boot component to be loaded into the operating memory for execution by the main processor of the computing device. Upon successful execution of the first boot component, the auxiliary hardware then performs an identical set of operations on the next boot component in the boot sequence before the next boot component can be accessed and invoked by the main processor. This process continues until the integrity of all boot components has been verified and all boot components have been executed.

When, however, a calculated hash value for a particular boot component does not satisfy the trusted, acceptable hash value for that component, this tends to indicate that the boot component is infected (e.g., with a virus) or is otherwise corrupted. Consequently, the auxiliary hardware undertakes remedial measures to ensure that only an uncorrupted boot component is executed by the main processor of the computing device. First, the auxiliary hardware obtains a trusted boot component corresponding to the particular corrupted boot component. The trusted boot component may, for instance, be stored in a dedicated memory or storage medium of the computing device that is only accessible by the auxiliary hardware. In another example, the auxiliary hardware may obtain the trusted boot component from a trusted boot component server. In either case, the auxiliary hardware overwrites the corrupted component of the computing device with the trusted boot component and directs the computing device to execute the new copy of the trusted boot component or re-initiate the entire boot sequence. In this manner, the auxiliary hardware ensures that each boot component loaded into the processor's operating memory is not infected or otherwise corrupted.

In one embodiment, the invention is directed to a method for calculating, with an auxiliary circuit within a computing device, an integrity verification value for a boot component of the computing device, wherein the boot component comprises program instructions required for execution by a processor of the computing device to place the computing device into an operating mode, determining whether the calculated integrity verification value is associated with an acceptable boot component, and replacing, with the auxiliary circuit of the computing device, the boot component with a copy of a trusted version of the boot component when the integrity verification value is not associated with an acceptable boot component.

In another embodiment, a computing device contains an auxiliary circuit that comprises an infection detection circuit configured to calculate an integrity verification value for a boot component of the computing device, wherein the boot component comprises program instructions required for execution by a processor of the computing device to place the computing device into an operating mode, an infection detection circuit configured to determine whether the integrity verification value is associated with an acceptable boot component, and a recovery circuit configured to replace the boot component with a copy of a trusted version of the boot component when the integrity verification value is not associated with an acceptable boot component.

In another embodiment, a system comprises a computing device and a trusted boot component server that stores trusted versions of boot components for the computing device. The computing device contains an auxiliary circuit that includes an integrity verification value calculator circuit that calculates an integrity verification value for a boot component of the computing device, wherein the boot component comprises program instructions required for execution by a processor of the computing device to place the computing device into an operating mode, an infection detection circuit that determines whether the integrity verification value is associated with an acceptable boot component, and a recovery circuit that replaces the boot component with a copy of a trusted version of the boot component received from the trusted boot component server when the integrity verification value is not associated with an acceptable boot component.

The techniques described herein may provide one or more advantages. For example, performing the integrity verification and replacement actions using an auxiliary hardware on the device prevents an infection from impeding its own removal, for the malicious or infected software does not have access to control logic for the auxiliary hardware or the trusted repository that stores original copies of trusted boot components. By increasing the probability of the successful detection and removal of infections, use of the techniques described herein decreases the likelihood that the entire operating system of the device as well as other non-infected boot components will require reinstallation.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
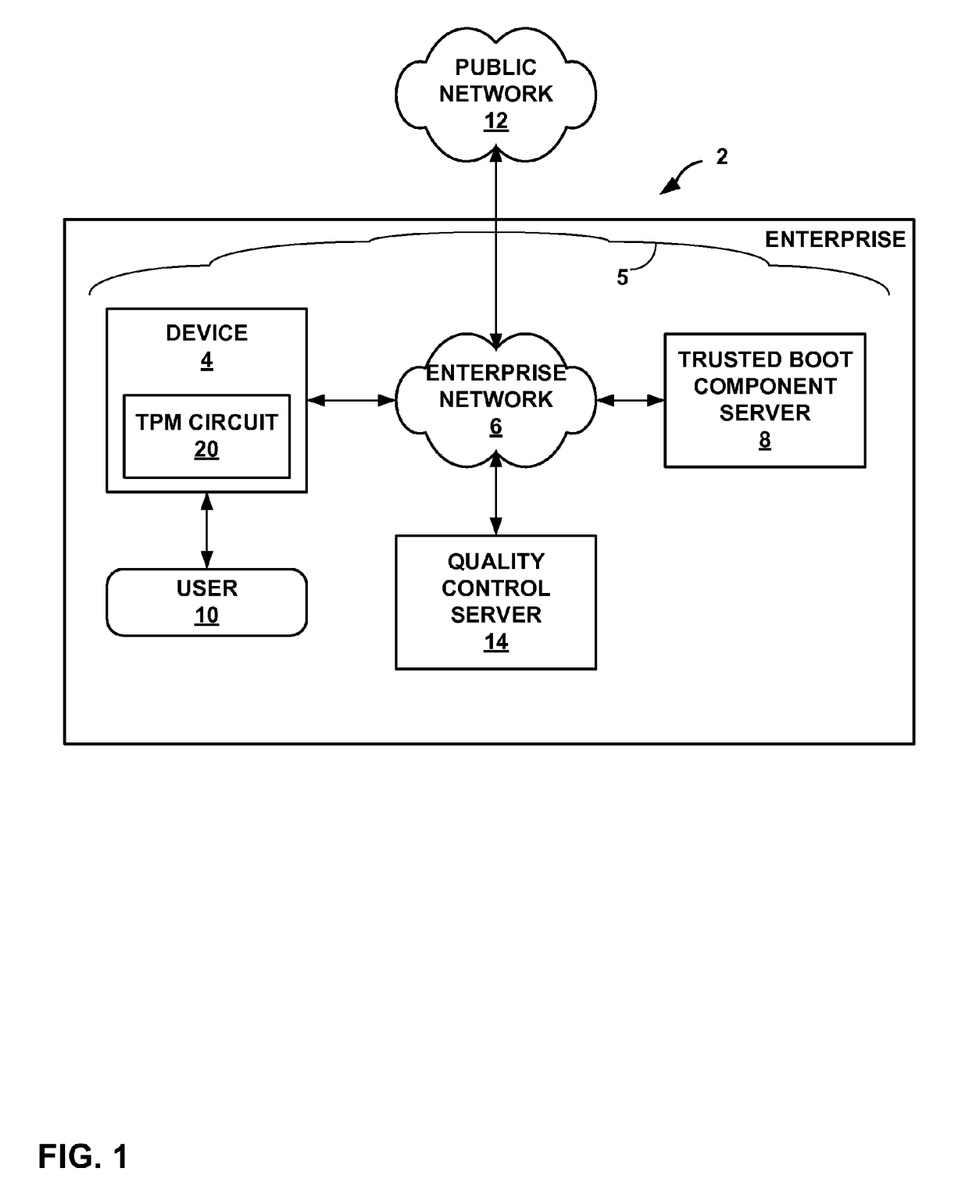
FIG. 1 is a block diagram illustrating an exemplary system that implements the corrupted boot component detection and replacement techniques described in this disclosure.

FIG. 1 is a block diagram illustrating an exemplary system 2 that implements the infected boot component detection and selective replacement techniques described in this disclosure. In the example of FIG. 1, system 2 includes a device 4 connected to enterprise network 6. Further, in this example, device 4 is a computing device, such as a personal computer, a laptop computer, a mobile telephone, a network telephone, a television set-top box, a video game system, a point-of-sale device, a personal digital assistant, an intermediate network device, a network appliance, a supercomputer, a mainframe computer, an embedded controller, an industrial robot, or another type of device capable of interfacing with and communicating over enterprise network 6. Device 4 may provide an interface (e.g., display, speakers, keyboard, mouse, and the like) with which user 10 interacts to execute software applications provided by device 4 and access resources provided by enterprise network 6 and public network 12. In some embodiments, device 4 is automated and does not interact with a user.

Public network 12 is connected to enterprise network 6. Both enterprise network 6 and public network 12 may include a plurality of network devices (not shown in FIG. 1) that facilitates the access of content by device 4. Each of the plurality of network devices may comprise one of a router, a switch, a server, a database, a hub, a firewall, a detection intrusion/prevention (IDP) device and/or any other type of networking equipment or device that facilitates the transfer of data to and from device 4.

Enterprise network 6 and public network 12 may transmit content to device 4 via one or more packet-based protocols, such as an Internet Protocol (IP)/Transmission Control Protocol (TCP). In this respect, enterprise network 6 and public network 12 may support the transmission of data via discrete data units, often referred to as "packets." As a result, enterprise network 6 and public network 12 may be referred to as a "packet-based" or "packet switched" networks. While described in this disclosure as transmitting, conveying, or otherwise supporting packets, enterprise network 6 and public network 12 may transmit data according to any other discrete data unit defined by any other protocol, such as a cell defined by the Asynchronous Transfer Mode (ATM) protocol.

In addition, enterprise network 6 and public network 12 may each be a local area network ("LAN"), such as a token ring or Ethernet network, a virtual local area network ("VLAN"), or another type of network. Enterprise network 6 and public network 12 may comprise one or more wired or wireless links. For example, enterprise network 6 may be an Ethernet network that comprises one or more Ethernet cables. In another example, public network 12 may be a Wireless Fidelity ("Wi-Fi") network that uses wireless radio transmissions to communicate information.

Enterprise network 6 and public network 12 provide a variety of resources for which device 4 desires access. In the example of FIG. 1, enterprise network 6 includes quality control server 14 and trusted boot component server 8; typically enterprise network 6 will also connect to a variety of other types of devices (e.g., file servers, printers, telephones, and e-mail and other application servers). Public network 12 may provide access to web servers, application servers, public databases, media servers, end-user devices, and many other types of network resource devices and content.

Enterprise network 6 operates behind enterprise boundary 5, which may be implemented with a firewall device, an intermediate network device, an intrusion detection device, an Internet Protocol Security gateway device, or any other type of device that controls access to one or more networks. Public network 12 typically provides content for device 4 via enterprise network 6 after receiving permission from enterprise boundary 5.

In some circumstances, content provided by public network 12 may include malicious software (or "malware") such as a virus or other trojan horse, or a worm. In addition, a device included in public network 12 may breach enterprise boundary 5 and use enterprise network 6 to infect device 4 with malware. The malware infecting device 4 may have the capacity to alter key software components on the device. In many cases, the malware is able to erase, infect, or otherwise alter the software boot components responsible for loading the software necessary for device 4 to enter a normal operating condition. For example, a virus present on device 4 may change the operating system kernel to prevent user 10 from interacting with the device. In another example, a virus may infect the boot sector of device 4 in order to gain control of the device at startup. Device 4 may also become corrupted, and thus experience suboptimal operation, as a result of user errors or errors in device 4 components, either software or hardware, that alter any of the boot components on the device.

In accordance with the techniques of this disclosure, device 4 includes Trusted Platform Module ("TPM") circuit 20, an auxiliary hardware for detecting and replacing, during the boot sequence for the device, an infected boot component with a trusted boot component. TPM circuit 20 is hardware unit separate from any main processor of device 4, and may be an application-specific integrated circuit (ASIC), a field-programmable gate array (FPGA), a complex programmable logic device (CPLD), a programmable logic array (PLA), any combination of these elements, or any other type of hardware that is capable of performing infection detection and replacement functions and interacting with certain other hardware components of device 4. In some embodiments, TPM circuit 20 may be a separate microprocessor or a microcontroller capable of running dedicated software or firmware instructions from a trusted storage medium internal to device 4, such as a read-only memory (ROM), which is inaccessible to software instructions executed by the main processor of the device. In some embodiments, TPM circuit 20 is a modified trusted platform module chip that is otherwise substantially consistent with the specification for trusted platform module chips described in "TPM Main Part 1 Design Principles Specification Version 1.2," published by Trusted Computing Group, which is hereby incorporated by reference.

In general, prior to allowing any boot component to be loaded into the processor's operating memory and executed, TPM circuit 20 verifies the integrity of the component in order to detect the presence of an infection. If the component manifests an infection or otherwise fails the integrity verification, TPM circuit 20 selectively replaces only the infected component with a copy of a trusted boot component obtained from a trusted source. A trusted boot component, as the term is used throughout this disclosure, is a version of the boot component software that is known to be free of infection and corruption. Typically, the trusted source will be a non-volatile memory device included in device 4. In some embodiments, the trusted source is a repository that cannot be written or modified by the main processor of device 4. By replacing the infected component with a copy of a trusted boot component obtained from a trusted source, TPM circuit 20 ensures that the boot components loaded into operating memory for execution by the processor of device 4 are free of infection and corruption and will not lead to undesirable device operation.

More specifically, in one embodiment the hardware architecture of device 4 requires that the main processor invoke TPM circuit 20 in order to load and execute each boot component in the sequence. That is, after a given boot component is loaded and executed, the main processor must again invoke TPM circuit 20, and the TPM circuit 20 must output one or more signals to permit the main processor to load and execute the next boot component in the sequence. If the boot component to be loaded and executed manifests an infection or otherwise fails the integrity verification, TPM circuit 20 selectively replaces only the infected component with a copy of a trusted boot component obtained from a trusted source prior to outputting such signals. For example, TPM circuit 20, after replacing a particular infected boot component (e.g., the operating system kernel) with a copy of the corresponding trusted boot component, may then output the necessary signals to permit the main processor to continue with the boot sequence. In this way, the replacing of the corrupted component with a copy of the trusted component may be seamless and transparent to the main processor. Alternatively, TPM circuit 20 may output a signal to direct the main processor to rerun one or more previous boot components in the boot sequence. For instance, if TPM circuit 20 replaces the operating system kernel due to an infection in that component, the TPM circuit 20 afterward may direct device 4 to rerun the boot loader, which is responsible for loading the kernel into operating memory. Further, after replacing the infected boot component TPM circuit 20 may initiate a hardware reset causing the main processor to restart the entire boot sequence.

In some embodiments, after TPM circuit 20 verifies the integrity of the first boot component in the sequence and the first boot component is loaded into memory, CPU 44 and TPM circuit 20 may cooperate to perform the integrity verification and selective replacement techniques described above. The assistance of CPU 44 may in some cases enhance the speed at which the boot components can be verified and loaded.

Rather than initiate a restart or otherwise take immediate remedial action upon detecting an infection, TPM circuit 20 may simply wait for a restart initiated by user 10 before performing the disclosed techniques. Such a circumstance may arise, for instance, where there is a particularly urgent need for device 4 to proceed in an operative mode. In this circumstance, TPM circuit 20 may provide an indication to user 10 that device 4 is operating in a state of compromise, thereby prompting user 10 to restart device 4 when convenient. The indication may take the form of, for instance, a message on a display, an indicator light, a chime or beep, a voice message, an e-mail, or any other method useful for informing user 10 that device 4 is compromised.

In addition to boot-time inspection and automated recovery, device 4 may periodically inspect itself for indications of an infection. Inspection may be performed, for example, by anti-virus software, by performance monitoring software, or by TPM circuit 20. Where TPM circuit 20 is responsible for inspecting the device, it may act autonomously by periodically performing integrity verification of the boot components, or it may act in response to requests from the device 4 operating system (possibly as initiated by user 10), a program running on device 4, or another device connected to enterprise network 6 such as quality control server 14. Where device 4 suspects the presence of an infection in one or more of the boot components, the device may initiate a restart in order to rerun the boot sequence in accordance with the techniques of this disclosure. Alternatively, device 4 may halt operation, for example by unloading the operating system, and direct TPM circuit 20 to perform an integrity check of the current boot components and selectively replace those components containing infections.

In the example of FIG. 1, an enterprise system administrator may elect to additionally or alternatively deploy quality control server 14 with system 2 to proactively monitor device behavior and remediate infections on devices connected to enterprise network 6. Quality control server 14 may be a high-end server, a workstation, a data center, an intermediate network device, a network appliance, a supercomputer, a mainframe computer, or another type of device capable of monitoring the behavior of other devices on a network.

For example, quality control server 14 may observe network traffic sent from device 4 as well as any other actions that may indicate that the device has been compromised with an infection and is, for example, operating in an undesirable state. In another example, quality control server 14 may use port-scanning techniques to identify unusual open ports on device 4, thus indicating the potential presence of malware on device 4. In another example, quality control server 14 monitors electronic reports from device 4 detailing the productivity of device 4, such as the operating rate of connected instruments, the rate of data production or analysis, or other productivity metrics. Quality control server 14 may determine that abnormally low productivity of device 4 is indicative of compromise. As yet an additional example, device 4 may send information describing its status and software configuration directly to quality control server 14 along with a request for the server to determine, from the information, whether device 4 is compromised.

Where quality control server 14 determines that device 4 is compromised, it may direct device 4 to undertake remedial measures. For instance, in response to a signal or other message from quality control server 14 that it is compromised, device 4 may initiate a restart in order to rerun the boot sequence in accordance with the techniques of this disclosure. In another example, device 4 may halt operation and direct TPM circuit 20 to undertake remedial measures, such as replacing the infected boot component with a trusted version. TPM circuit 20, upon notification of an infection, may simply wait for a restart initiated by user 10 before rerunning the boot sequence. In this circumstance, TPM circuit 20 may provide an indication to user 10 that device 4 is operating in a state of compromise.

In the example of FIG. 1, network system 2 includes an optional trusted boot component server 8 that stores and, when requested, provides copies of trusted boot components to device 4. Trusted boot component server 8 may be a high-end server, a workstation, a data center, an intermediate network device, a network appliance, a supercomputer, a mainframe computer, a file server, or another type of device capable of securely storing content and transmitting the stored content over enterprise network 6. Trusted boot component server may include a hard disk or other non-volatile storage medium (not shown) that is write-protected. In this case of a write-protected storage medium, it is impossible for the trusted boot component server storage medium to be modified without physical intervention by a server administrator. In this manner, data stored on the medium is not subject to corruption or to infection by malware.

As stated above, trusted boot components are typically stored in a non-volatile memory device within device 4. However, in some circumstances, an administrator for system 2 may find it desirable to maintain a centralized repository, trusted boot component server 8, for the trusted boot components. In this circumstance, TPM circuit 20 signals trusted boot component server 8 by way of secure network communications (e.g., via Secure Socket Layer communications or other encrypted means) to retrieve and respond with a copy of a particular trusted boot component with which to replace a corresponding infected component on device 4. In some embodiments, TPM circuit 20 may incorporate a network interface card (NIC) or other network connect inaccessible to the main processor of the device and software applications executing thereon so as provide additional security for the retrieval of trusted copies of the boot components. Further, in some cases, system 2 may include a dedicated network link (not shown) between device 4 and trusted boot component server 8 that may obviate the need for trusted boot component server 8 to connect to enterprise network 6. A dedicated network connection decreases the probability that trusted boot component server 8 and the trusted boot components therein will be compromised by an infection received via enterprise network 6. Moreover, a dedicated network connection may prevent spoofing attacks, whereby a compromised device connected to enterprise network 6 pretends to be a trusted boot component server in order to impair the operation of system 2. In some embodiments, cryptographic protection (e.g. session security or digital signatures) may be employed instead of or in conjunction with a dedicated network connection.

In general, an administrator for system 2 interacts with quality control server 14 so as to maintain trusted boot components in a form that can be individually retrieved and communicated to devices, such as device 4. The administrator for system 2 can replace a particular trusted boot component on trusted boot component server 8 with an updated version. Where enterprise network 6 is connected to a number of similar devices that implement the techniques described in this disclosure, each device (e.g., device 4) is able to download the updated version of the trusted boot component unassisted by the administrator. In this manner, the administrator can efficiently distribute updated boot components to the devices connected to enterprise network 6.

Figure 2:
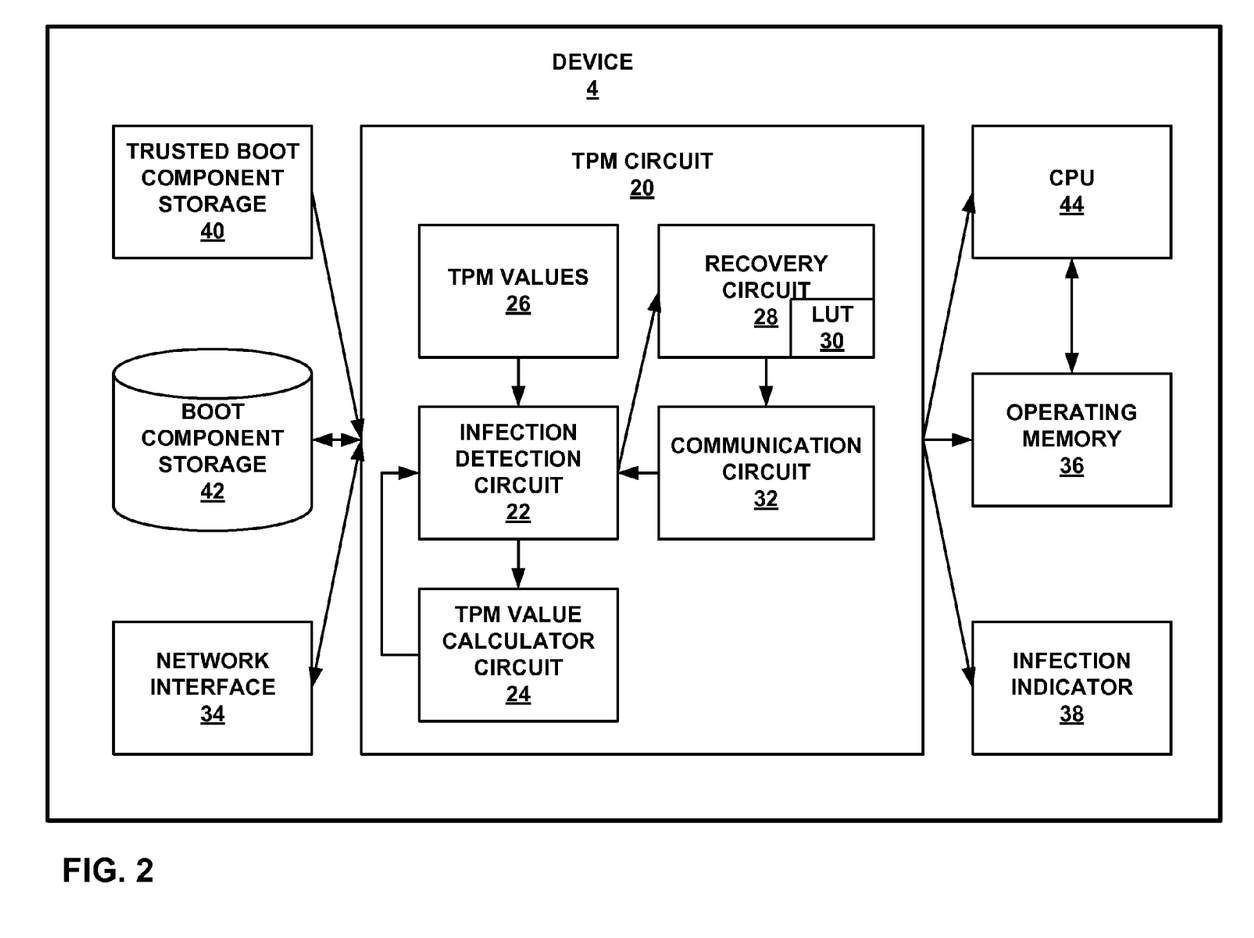
FIG. 2 is a block diagram illustrating exemplary details of an end-user device for the system of FIG. 1.

FIG. 2 is a block diagram illustrating, with exemplary details, one embodiment of device 4. As described above, device 4 is typically a computing device providing an operating environment for a plurality of hardware and software modules. For purposes of clarity, certain components, such as a keyboard, a display, an operating system and components commonly found in a computing device or appliance are not shown in FIG. 2.

In the example of FIG. 2, device 4 includes trusted boot component storage 40, boot component storage 42, network interface 34, TPM circuit 20, central processing unit ("CPU") 44 with operating memory 36, and infection indicator 38.

Network interface 34 fosters communication between device 4 and enterprise network 6 and comprises all hardware and software components necessary for such communication. Network interface 34 may be a wired or wireless network interface. For instance, network interface 34 may be an Ethernet network interface, a Wi-Fi network interface, or some other type of network interface. In some embodiments, network interface 34 interfaces with the dedicated network link to trusted boot component server 8 described above with respect to FIG. 1.

CPU 44 represents a device processor and may comprise one or more general- or special-purpose processors for executing the instructions contained in operating memory 36. Operating memory 36 contains the instructions necessary for typical operation of device 4 and will generally be a RAM device, such as DRAM or SDRAM.

Boot component storage 42 contains, as program instructions or parameters, device-specific boot components for the device 4 boot sequence. Boot component storage 42 may be electrically-erasable programmable read-only memory (EEPROM), compact disc rewritable memory (CD-RW), optical disk storage, magnetic disk storage or other magnetic storage devices, a dedicated disk partition, or any other storage medium that can be used to store program instructions or parameters and that can be accessed by a computer. In addition, where device 4 is network-bootable, boot component storage 42 represents a connection to a network partition. Boot component storage 42 may represent a plurality of the above-listed devices, where each device comprising boot component storage 42 contains a different subset of the required boot components.

Boot component storage 42 is generally writable in order to foster updates or other changes to the device 4 boot components by user 10 or by an administrator. For example, user 10 may install a new operating system to a disk partition comprising boot component storage 42. In another example, user 10 may install a second operating system onto a second partition comprising boot component storage 42. This operation may further require changes to other boot components in order to incorporate the location and boot instructions for the second operating system.

Content provided to device 4 by public network 12 may include malicious software (or "malware") such as a virus or other trojan horse, or a worm. In addition, a device included in public network 12 may breach enterprise boundary 5 and use enterprise network 6 to infect device 4 with malware. The malware infecting device 4 may erase, infect, or otherwise alter the boot components that comprise boot component storage 42. For example, a virus present on device 4 may change the operating system kernel to prevent user 10 from interacting with the device. In another example, a virus may infect the boot sector of device 4 in order to gain control of the device at startup. The boot components that comprise boot component storage 42 may also become corrupted, and thus experience suboptimal operation, as a result of user errors or errors in device 4 components, either software or hardware, that alter any of the boot components.

Trusted boot component storage 40 contains, as program instructions or parameters, trusted boot components corresponding to the boot components that comprise boot component storage 42. Trusted boot component storage 40 may be ROM, EEPROM, CD-ROM or other optical disk storage, magnetic disk storage or other magnetic storage devices, or any other medium that can be used to carry or store desired program code in the form of instructions or data structures and that can be accessed by a computer. Trusted boot component storage 40 will typically be separate, physically or logically, from boot component storage 42. In one example embodiment, trusted boot component storage 40 is a dedicated memory device connected directly to TPM circuit 20. In another example embodiment, trusted boot component storage 40 and boot component storage 42 are stored on the same hard disk but reside on separate partitions.

In some embodiments, trusted boot component storage 40 is non-writable to maximize security for the trusted boot components. In other embodiments, trusted boot component storage 40 is writable, but only insofar as user 10 or an administrator takes physical steps to overwrite boot components. Such physical steps may include, for example, removing and rewriting an EEPROM, connecting a JTAG-compatible memory chip to a programmer, or replacing a memory chip or CD-ROM disc. In other embodiments, trusted boot component storage 40 is writable by a user 10 or administrator having sufficient authorization to access software used for rewriting trusted boot component storage 40. Generally, prior to overwriting a trusted boot component, user 10 or an administrator will verify the integrity of the new version of the trusted boot component to ensure that the new version is not corrupted in any manner. For instance, user 10 may verify that the new version is digitally signed by a trusted third-party. In another example, user 10 may run a program to compute a cryptographic hash of the new version and compare the result with a known trusted value to which the computed hash value must conform.

TPM circuit 20, as described above in the context of FIG. 1, is an auxiliary hardware for detecting and replacing, during the boot sequence for the device, an infected boot component with a trusted boot component. TPM circuit 20 comprises infection detection circuit 22, TPM value calculator circuit 24, TPM values 26, recovery circuit 28, and communication circuit 32.

Each circuit-based component of TPM circuit 20 may be implemented as a microprocessor, a microcontroller, an ASIC, FPGA, CPLD, or PLA, any combination of these elements, or any other type of hardware capable of performing the respective functions of each component.

Communication circuit 32 provides network communication functionality for TPM circuit 20. For example, communication circuit 32 may be a set of hardware modules that provide hardware pathways with which TPM circuit 20 can signal network interface 34.

TPM values 26 comprises a set of trusted TPM values and may be implemented as a table, list, or other data structure in ROM, EEPROM, and other forms of non-volatile memory. The trusted TPM values are established prior to the boot component verification and replacement process by performing a cryptographic hash function on the trusted boot components that comprise trusted boot component storage 40. The resultant trusted TPM value for each trusted boot component is stored in TPM values 26. TPM values 26 may comprise a plurality of computed TPM values for each boot component. These correspond to a plurality of boot component versions that may permissibly execute on device 4.

In a typical embodiment, TPM circuit 20 begins operation when the power supply to TPM circuit 20 stabilizes. Because the power supply generally stabilizes soon after device 4 is powered on, TPM circuit 20 immediately begins verifying the integrity of the boot components for the boot sequence and replacing those components when corruption is detected. In other embodiments, device 4 may directly signal TPM circuit 20 in order to initiate an integrity verification and replacement operation.

Boot component integrity verification and replacement proceeds as follows. First, infection detection circuit 22 obtains the first boot component (e.g., the BIOS) from boot component storage 42. Infection detection circuit 22 then signals TPM value calculator circuit 24 to perform, for example, a cryptographic hash of the component in order to produce a corresponding TPM value. TPM value calculator circuit 24 may use any of the well-known hashing functions for calculating a TPM value, such as MD5, SHA-1, and the like. The TPM value calculator may also use other functions, such as a cyclic-redundancy check (CRC), to calculate a TPM value. The TPM value may therefore be a cryptographic hash, a CRC value, or any other value calculated as a digest of the boot component and useful as an integrity verification value. In some embodiments, the TPM value is a digital signature generated by a modified trusted platform module, as described in "TPM Main Part 1 Design Principles Specification Version 1.2." Infection detection circuit 22 then receives the calculated TPM value from TPM value calculator circuit 24 and compares the calculated TPM value with the set of trusted TPM values that comprise TPM values 26. If the computed TPM value is found within the set of trusted TPM values, the boot component is identical to a version of the boot component that may permissibly execute and therefore is not compromised. As a result, infection detection circuit 22 then directs CPU 44 to load the boot component into operating memory 36. Alternatively, infection detection circuit 22 itself loads the boot component into operating memory 36.

If, during the TPM value comparison step, the computed TPM value is not found within the set of trusted TPM values, then the boot component is compromised or otherwise corrupted. In this case, infection detection circuit 22 signals recovery circuit 28, which will attempt to recover from the compromised boot component. To inform recovery circuit 28 of the particular boot component that requires replacement, infection detection circuit 22 includes a component ID value (not shown), such as a name or storage location, for the compromised boot component in the signal.

Recovery circuit 28 comprises lookup-table (LUT) 30 that maps component ID values to storage locations, either in trusted boot component storage 40 or on trusted boot component server 8. LUT 30, while labeled as a lookup-table, may be any of a number of hardware structures capable of mapping component ID values to storage locations and may be implemented in an ASIC, FPGA, CPLD, PLA or functionally similar device.

If recovery circuit 28 is configured to replace the compromised boot component using a corresponding trusted boot component from trusted boot component storage 40, recovery circuit 28 queries LUT 30 to determine the location of the appropriate trusted boot component within trusted boot component storage 40. Thereupon, recovery circuit 28 uses the address to retrieve the appropriate trusted boot component from trusted boot component storage 40.

If, however, recovery circuit 28 is configured to replace the compromised boot component using a corresponding trusted boot component from trusted boot component server 8, recovery circuit 28 queries LUT 30 to determine the network address of trusted boot component server 8 and the location of the trusted boot component within trusted boot component server 8. The network address may be an IP address, network name (SSID), or any other reference for identifying a device connected to enterprise network 6. Recovery circuit 28 signals, using the network address and location retrieved from LUT 30, communication circuit 32 to request (via network interface 34) that trusted boot component server 8 respond with the appropriate trusted boot component. In some embodiments, LUT 30 does not contain the location of the trusted boot component within trusted boot component server 8. Here, recovery circuit 28 signals, using the component ID, communication circuit 32 to request (via network interface 34) that trusted boot component server 8 respond with the appropriate trusted boot component. Upon receiving a request from device 4, trusted boot component server 8 responds with the appropriate trusted boot component.

Recovery circuit 28, having obtained the appropriate trusted boot component from a trusted source, proceeds to overwrite, in boot component storage 42, the compromised boot component with the trusted boot component. In this manner, device 4 may ensure that the compromised boot component does not have an opportunity to load or execute during the boot sequence. After the replacement operation, recovery circuit 28 typically signals device 4 to reinitiate the boot sequence (i.e., restart) in order to foster a clean boot. However, in some embodiments, recovery circuit 28 additionally loads the trusted boot component into operating memory 36 for execution by CPU 44 and continues by verifying and, if necessary, replacing the later components in the boot sequence. In other embodiments, recovery circuit 28 signals CPU 44 to load the newly restored boot component from boot component storage 42 into operating memory 36 for execution. Recovery circuit 28 then continues by verifying and, if necessary, replacing the later components in the boot sequence.

The boot sequence for device 4 typically contains a number of boot components that must be loaded and executed before the device enters its normal operating condition. The techniques described above are performed with respect to every boot component in the sequence necessary to establish a trusted computing base-the set of software and hardware that must be operating properly (i.e., without compromise) in order for device 4 to meet its expected behavior and maintain security. For example, a boot sequence for device 4 may proceed from the BIOS to the boot loader to the operating system. For this exemplary boot sequence, TPM circuit 20 first performs an integrity check for the BIOS, then for the boot loader, then for the operating system. If, in this example, the operating system is the final component required to establish a trusted computing base, then the integrity check for the boot components is complete once an uncompromised operating system is loaded. At this stage, TPM circuit 20 enters a waiting state, and device 4 enters normal operation.

At any point during its normal operation, device 4 can signal TPM circuit 20 to perform the integrity verification and replacement techniques on the boot components. As described above with respect to FIG. 1, device 4 may initiate the techniques in response to a request from quality control server 14. In addition, anti-virus or other detection software running on device 4 may suspect that one or more of the boot components are compromised and direct device 4 to undertake restorative measures using TPM circuit 20. In another example, other software running on device 4, such as the operating system, may be configured to periodically signal TPM circuit 20. Quality control server 14 may instagate the integrity verification and replacement techniques by sending a network message to network interface 34, which in turn signals TPM circuit 20 via communication circuit 32. Finally, TPM circuit 20 itself may be configured to periodically perform the techniques.

Where the integrity verification and replacement operations take place after device 4 has entered normal operation, TPM circuit 20 performs a subset of the techniques described above. The various circuit components of TPM circuit 20 function to verify the integrity of each boot component in the boot sequence. If an infected boot component is found, TPM circuit 20 signals device 4 to reinitiate the boot sequence (i.e., restart) in order to replace the infected boot component in accordance with the techniques described above. In a high security environment, immediate restart of compromised device 4 may be mandated in order to prevent the exposure of sensitive information to unauthorized agents due by the infection.

Rather than initiating a restart of device 4 upon discovering an infection, TPM circuit 20 may alternatively signal infection indicator 38 to warn user 10 that device 4 is compromised. That is, after determining that an infection is present, TPM circuit 20 may simply warn user 10 of the infection rather than immediately undertaking restorative actions. In this manner, device 4 can continue operating where, for example, there is an urgent need for the services of the device. Infection indicator 38 may be, for example, a speaker, an LED, or a software module that includes the capacity to send an email to user 10 or raise an alert on a display. At an opportune time, user 10 can restart device 4, thereby initiating TPM circuit 20 to perform the boot component integrity verification and replacement techniques described above. For example, user 10 may restart device 4 after backing up all of the user settings for future restoration. In other embodiments, infection indicator 38 may present the user with the option of immediately performing the boot component integrity verification and replacement techniques.

Figure 3:
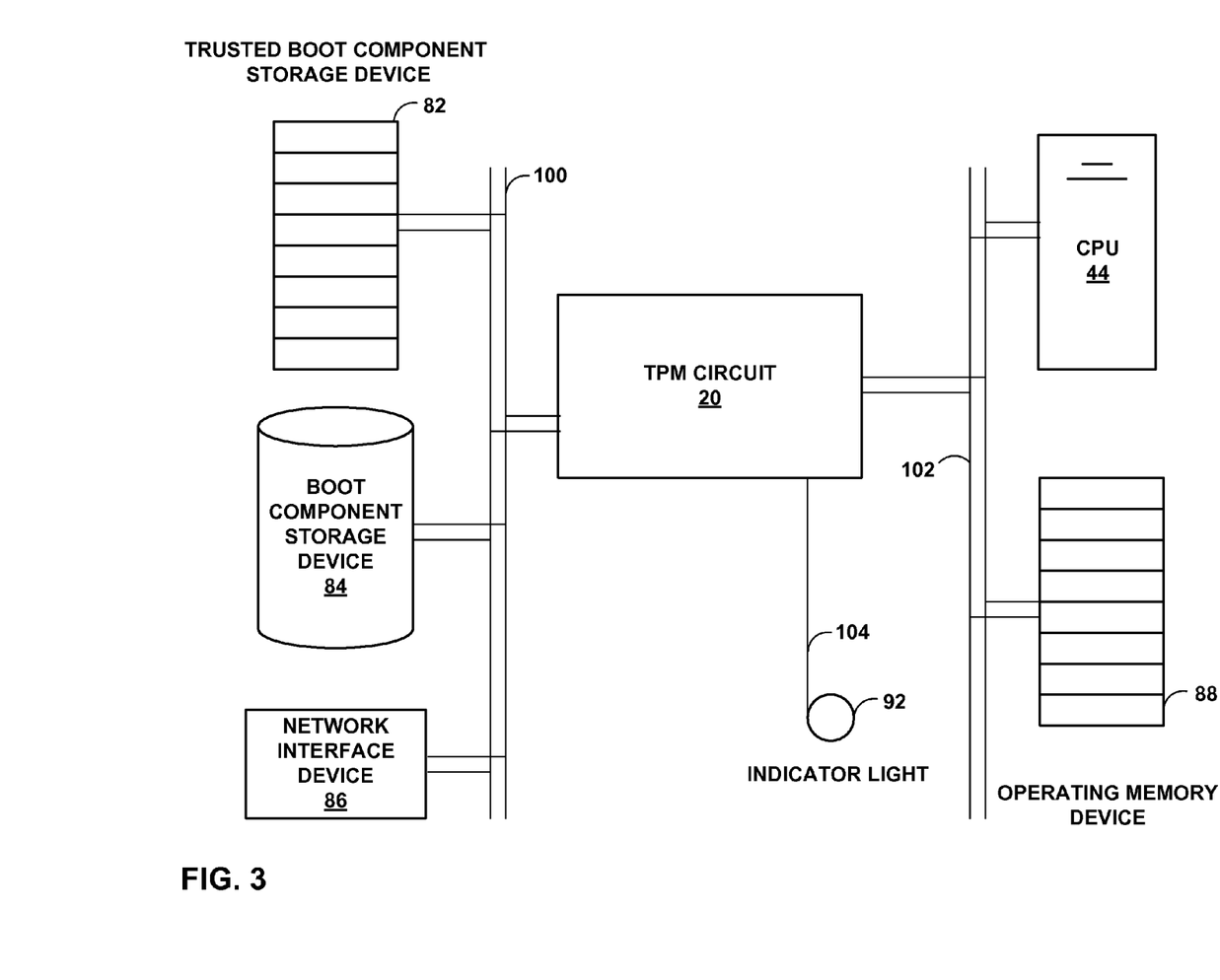
FIG. 3 is a block diagram illustrating exemplary details of a device architecture for the end-user device of FIG. 2.

FIG. 3 is block diagram illustrating an exemplary system architecture for the device of FIG. 2. Trusted boot component storage device 82 is an implementation of trusted boot component storage 40 of FIG. 2. Boot component storage device 84 is an implementation of boot component storage 42 of FIG. 2. Network interface device 86 is an implementation of network interface 34. Operating memory device 88 is an implementation of operating memory 36. Finally, indicator light 92 is an example of infection indicator 38.

Trusted boot component storage device 82, boot component storage device 84, and network interface device 86 each interface with each other, and with TPM circuit 20, using system bus 100. CPU 44 and operating memory device 88 interface with each other, and with TPM circuit 20, using system bus 102. System buses 100 and 102 represents a plurality of wired connections that enables signals to pass among the devices to which it is connected. System buses 100 and 102 may each be serial or parallel buses. Connected devices may use, and system buses 100 and 102 may support, any of a number of bus protocols, including I2C, PCI, AGP, or HyperTransport, in order to signal one another.

Indicator light 92 is shown directly connected to TPM circuit 20 via wire 104. Wire 104 may include other basic electronic components, such as resistors or capacitors, required in order to employ indicator light 92.

Figure 4A:
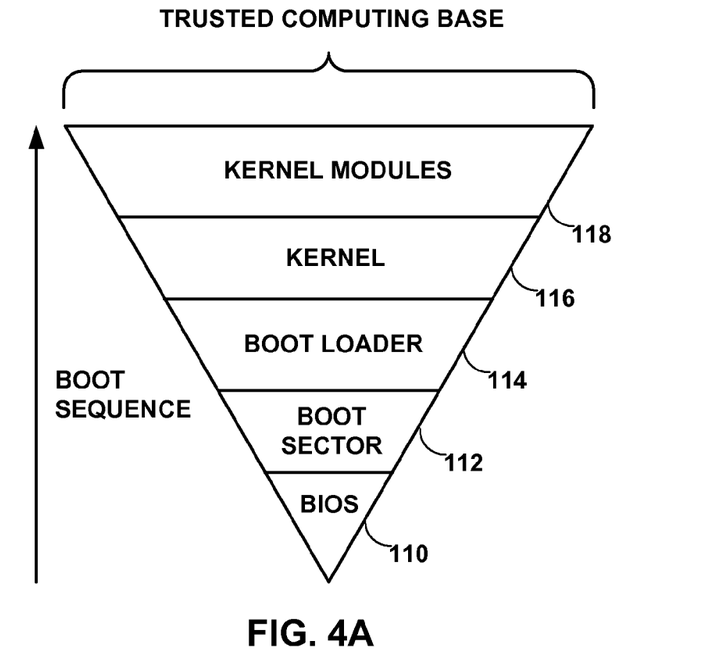
FIG. 4A is a block diagram illustrating exemplary boot components of the boot sequence for the device of FIG. 2.
Figure 4B:
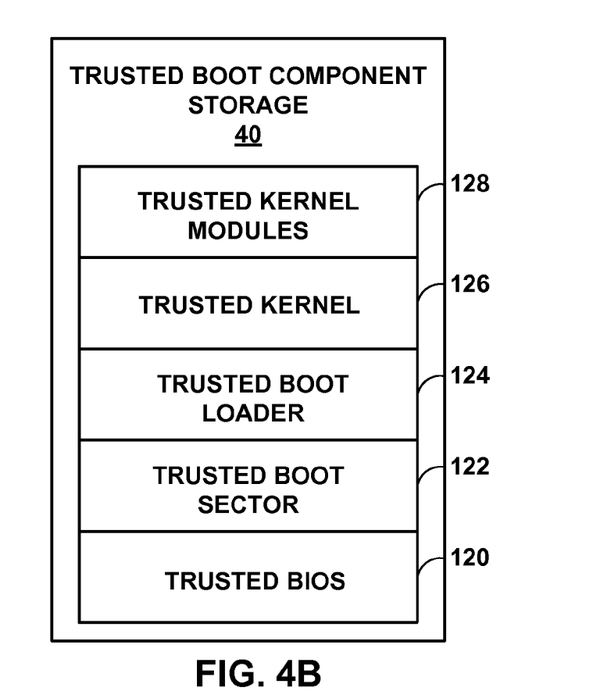
FIG. 4B is a block diagram illustrating exemplary trusted boot components corresponding to the exemplary boot components of FIG. 4A.

FIG. 4A is a block diagram illustrating an exemplary boot sequence for the device of FIG. 2. FIG. 4B is a block diagram illustrating, with exemplary trusted boot components, trusted boot component storage 40 included in the device of FIG. 2. Each trusted boot component included in trusted boot component storage 40 corresponds to a boot component in the boot sequence of FIG. 4A. The first boot component in exemplary boot sequence of FIG. 4A is BIOS 110. After verifying and, if necessary, replacing the BIOS with trusted BIOS 120, TPM circuit 20 proceeds to perform the techniques on boot sector 112, boot loader 114, kernel 116, and finally on kernel modules 118. Once an uncompromised version of the kernel modules is loaded into operating memory, device 4 contains a trusted computing base that permits the device to operate according to its expected behavior and maintain a basic level of security.

Figure 5A:
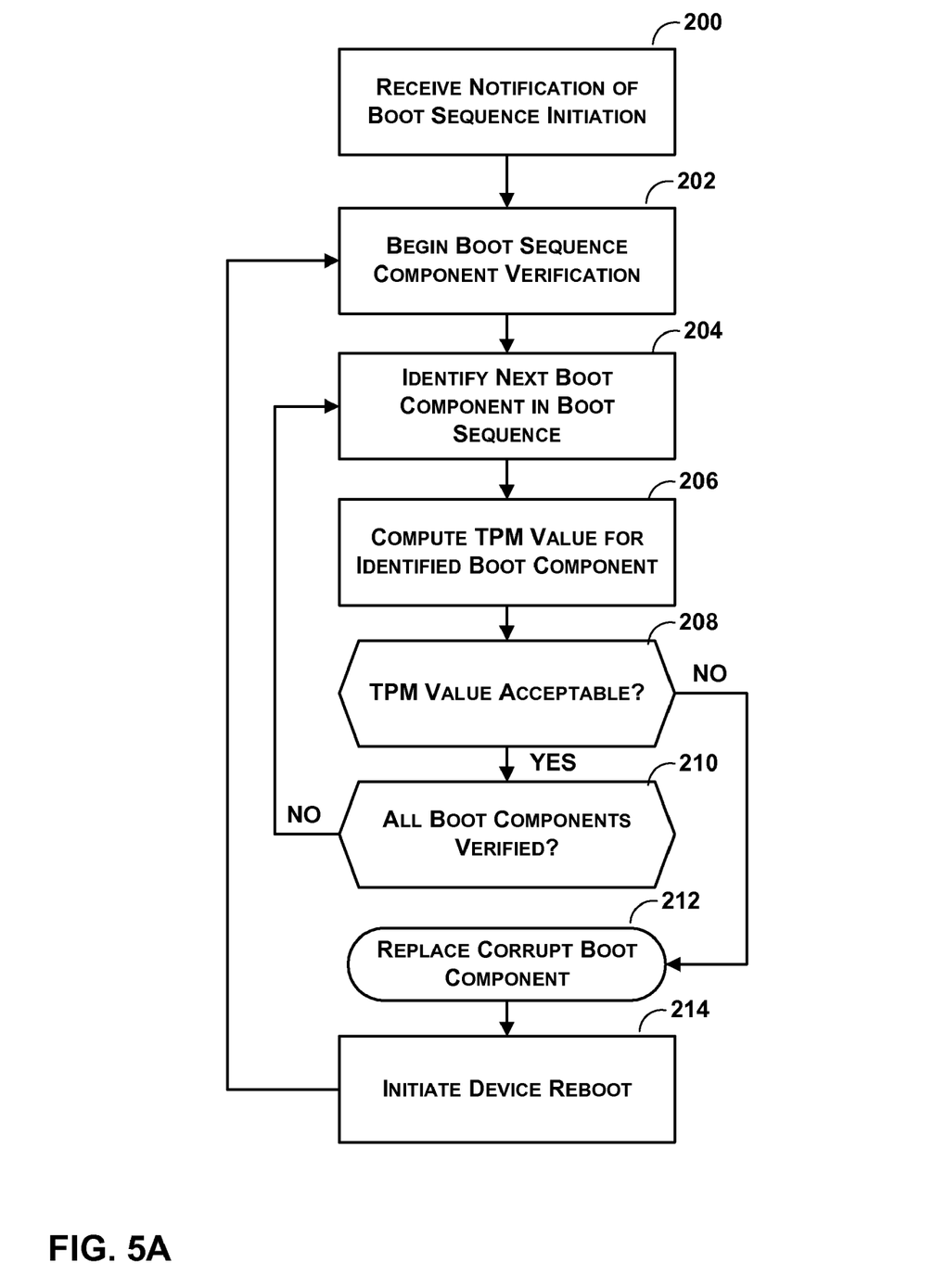
FIGS. 5A and 5B are flow charts illustrating an example mode of operation, for the device of FIG. 2, for detecting and replacing corrupt boot components in accordance with the techniques described herein.
Figure 5B:
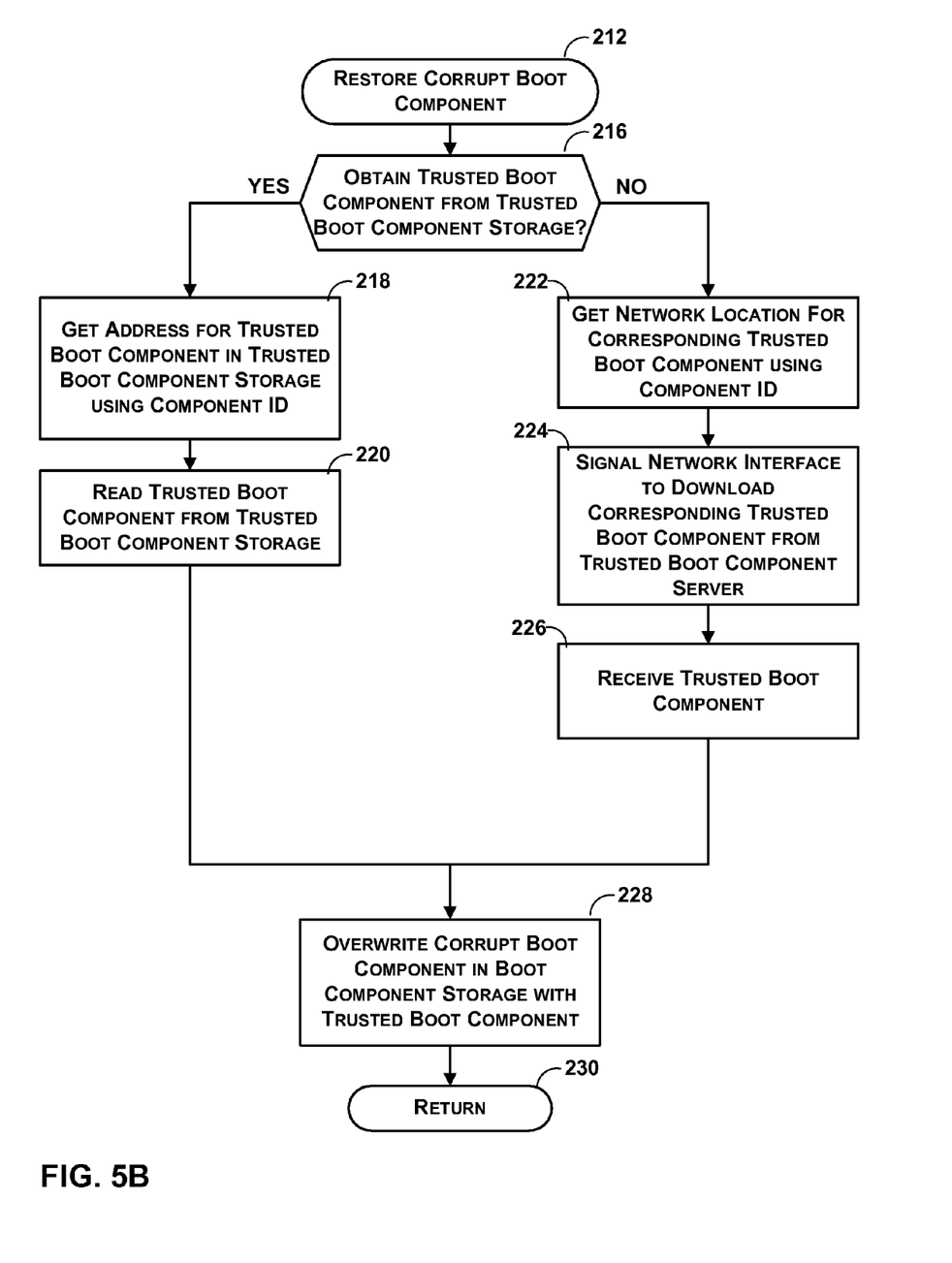

FIGS. 5A and 5B are flow charts illustrating an example mode of operation, for the auxiliary circuit of the device of FIG. 2, for detecting and replacing corrupt boot components in accordance with the techniques described above.

Initially, TPM circuit 20 receives a notification that a boot sequence for device 2 has been initiated (200). TPM circuit 20 addresses the notification by initiating a process for verifying the integrity of the boot sequence components of device 2 (202). To begin the process, TPM circuit 20 identifies the next boot component in the boot sequence that is to be loaded into operating memory 36 by device 2 (204). TPM circuit 20 then performs a cryptographic hash of the identified component to produce a corresponding TPM value (206). In order to determine whether the boot component is corrupt, infection detection circuit 22 compares the computed TPM value with a set of trusted TPM values 26 (208).

If infection detection circuit 22 finds the computed TPM value within the set of trusted TPM values 26, the boot component is identical to a version of the boot component that may permissibly execute and therefore is not compromised. CPU 44 of device 2 may now access and invoke the verified boot component, thereby advancing the boot sequence. TPM circuit 20 then performs an identical set of operations on the next boot component; this process continues until all boot components in the boot sequence are verified (210).

If, however, the TPM value is not found within the set of trusted TPM values 26, the boot component is corrupt and is replaced using a corresponding trusted boot component from a trusted repository (212). TPM circuit 20 obtains the trusted boot component from a trusted repository which, in the example of FIG. 5B, is either a dedicated memory or storage medium for device 2, such as trusted boot component storage 40, or a network device that configured to provide trusted boot components, such as trusted boot component server 8 (216).

Where trusted boot component storage 40 maintains the trusted boot components, recovery circuit 28 uses the component ID of the corrupt boot component to obtain the address of the corresponding trusted boot component within trusted boot component storage 40 (218). Recovery circuit 28 then reads the trusted boot component from its address in trusted boot component storage 40 (220). Finally, recovery circuit 28 overwrites the corrupt boot component in boot component storage 42 with the trusted boot component (228).

Where the trusted boot components are maintained on trusted boot component server 8, recovery circuit 28 uses the component ID of the corrupt boot component to determine the network address of trusted boot component server 8 and the location of the corresponding trusted boot component within trusted boot component server 8 (222). Recovery circuit 28 signals, using the obtained network address and location, communication circuit 32 to request (via network interface 34) that trusted boot component server 8 respond with the appropriate trusted boot component (224). Communication circuit 32 receives the trusted boot component, sent in response by trusted boot component server 8. Finally, recovery circuit 28, using the trusted boot component, overwrites the corrupt boot component in boot component storage 42 (228).

After the corrupt boot component is overwritten, TPM circuit 20 prompts a reboot of device 2 to reinitiate the boot sequence (214).

Various embodiments of the invention have been described. These and other embodiments are within the scope of the following claims.

The invention claimed is:

1. A method comprising:
    calculating, with an auxiliary circuit within a computing device, an integrity verification value for a boot component of the computing device, wherein the boot component comprises program instructions required for execution by a processor of the computing device to place the computing device into an operating mode, wherein the auxiliary circuit is coupled to the processor by a first bus;
    determining whether the calculated integrity verification value is associated with an acceptable boot component; and
    replacing, with the auxiliary circuit of the computing device, the boot component with a copy of a trusted version of the boot component when the integrity verification value is not associated with an acceptable boot component, wherein replacing the boot component with a copy of a trusted version of the boot component comprises:

with the auxiliary circuit, reading the copy of the trusted version of the boot component from a trusted storage medium on the device, wherein the trusted storage medium is coupled to the auxiliary circuit by a second bus and is inaccessible by the processor; and overwriting the boot component in a primary storage of the computing device with the copy of the trusted version of the boot component.

2. The method of claim 1, further comprising after replacing the boot component, outputting a signal with the auxiliary circuit to direct the processor of the computing device to execute the copy of the trusted version of the boot component.

3. The method of claim 2, wherein the boot component is one of a plurality of boot components in a boot sequence of the computing device, the method further comprising:

after replacing the boot component, executing the copy of the trusted version of the boot component with the processor;

after executing the copy of the trusted version of the boot component, determining, with the processor, whether at least one additional boot component remains in the boot sequence of the computing device; and outputting a signal with the processor to the auxiliary circuit to request that the auxiliary circuit calculate an integrity verification value for the additional boot component.

4. The method of claim 3, wherein executing the copy of the trusted version of the boot component comprises executing only the copy of the trusted version of the boot component without re-executing any of the plurality of boot components the precede the boot component in the boot sequence.

5. The method of claim 4, further comprising:

sequentially verifying each of the boot components in the boot sequence and selectively replacing only the boot components that are unacceptable by:

(a) selecting, with the processor, a next one of the boot components in the boot sequence that has not been executed by the processor since a power-up of the computing device;

(b) calculating, with the auxiliary circuit, an integrity value for the next one of the boot components, (c) determining whether the calculated integrity verification value is associated with an acceptable boot component, (d) replacing, with the auxiliary circuit of the computing device, the next one of the boot components with a copy of a trusted version of the next one of the boot components when the integrity verification value is not associated with an acceptable boot component, (e) without re-executing any of the boot components in the boot sequence that precede the next one of the boot components, executing the copy of the trusted version of the next one of the boot components the processor of the computing device, (f) determining whether at least one boot component remains in the boot sequence, and (g) when additional boot components remain in the boot sequence, repeating the steps (a)-(f) for each remaining boot component in the sequence.

6. The method of claim 3, further comprising sequentially verifying each of the boot components in the boot sequence and selectively replacing only the boot components that are unacceptable with trusted copies.

7. The method of claim 1, further comprising receiving, with the computing device, a message from a quality control server indicating that one or more boot components are infected or corrupt.

8. The method of claim 1, further comprising outputting, with the auxiliary circuit, a reset signal to the computing device after replacing the boot component with a copy of a trusted version of the boot component.

9. The method of claim 1, wherein determining whether the calculated integrity verification value is associated with an acceptable boot component comprises comparing the calculated integrity verification value with a list of stored values, wherein each stored value corresponds to an acceptable boot component.

10. The method of claim 1, wherein replacing the boot component with a copy of a trusted version of the boot component comprises:

with the auxiliary circuit, reading the copy of the trusted version of the boot component from a trusted storage medium on the device; and overwriting the boot component in a primary storage of the computing device with the copy of the trusted version of the boot component.

11. The method of claim 10, wherein the trusted storage medium is inaccessible by the processor.

12. The method of claim 1, wherein the auxiliary circuit is a modified trusted platform hardware module, and wherein the integrity verification value is a digital signature.

13. The method of claim 1, further comprising after determining that the integrity verification value is not associated with an acceptable boot component, and prior to replacing the boot component with a copy of a trusted version of the boot component, providing an indication to a user that the integrity verification value is not associated with an acceptable boot component.

14. The method of claim 13, wherein the indication is one of a message on a display, an indicator light, a chime or beep, a voice message, or an e-mail.

15. The method of claim 13, further comprising receiving, with the auxiliary circuit, an input from the user directing the auxiliary circuit to replace the boot component with a copy of a trusted version of the boot component.

16. A method comprising:

calculating, with an auxiliary circuit within a computing device, an integrity verification value for a boot component of the computing device, wherein the boot component comprises program instructions required for execution by a processor of the computing device to place the computing device into an operating mode, wherein the auxiliary circuit is coupled to the processor by a first bus;

determining whether the calculated integrity verification value is associated with an acceptable boot component; and replacing, with the auxiliary circuit of the computing device, the boot component with a copy of a trusted version of the boot component when the integrity verification value is not associated with an acceptable boot component, wherein replacing the boot component with a copy of a trusted version of the boot component comprises:

with the auxiliary circuit, requesting a copy of a trusted version of the boot component from a trusted boot component server using a network interface coupled to the auxiliary component by a second bus, wherein the trusted boot component server is a network device that stores trusted versions of boot components for the computing device, and further wherein the trusted boot component server is coupled to the network interface by a dedicated network link that is inaccessible to the processor;

receiving the copy of a trusted version of the boot component from the trusted boot component server;

overwriting the boot component in primary storage with the copy of a trusted version of the boot component.

17. A computing device comprising:

a processor;

a primary storage that stores a boot component;

a trusted storage medium that stores a trusted version of the boot component;

an auxiliary circuit coupled to the processor by a first bus and coupled to the trusted storage medium by a second bus such that the trusted storage medium is inaccessible by the processor, wherein the auxiliary circuit comprises:

an integrity verification value calculator circuit configured to calculate an integrity verification value for the boot component of the computing device, wherein the boot component comprises program instructions required for execution by the processor of the computing device to place the computing device into an operating mode;

an infection detection circuit configured to determine whether the integrity verification value is associated with an acceptable boot component; and a recovery circuit configured to replace the boot component with a copy of a trusted version of the boot component when the integrity verification value is not associated with an acceptable boot component, wherein, to replace the boot component with a copy of a trusted version of the boot component, the recovery circuit is configured to read the copy of the trusted version of the boot component from the trusted storage medium and to overwrite the boot component in the primary storage with the copy of the trusted version of the boot component.

18. The computing device of claim 17, wherein the recovery circuit is configured to output a signal to direct the processor of the computing device to execute the copy of the trusted version of the boot component after it replaces the boot component.

19. The computing device of claim 18, wherein the boot component is one of a plurality of boot components in a boot sequence, wherein, after executing the copy of the trusted version of the boot component, the processor determines whether at least one additional boot component remains in the boot sequence of the computing device and outputs a signal to the auxiliary circuit to request that the auxiliary circuit calculate an integrity verification value for the additional boot component.

20. The computing device of claim 19, wherein the processor of the computing device, in response to receiving the signal from the auxiliary circuit, is configured to execute only the copy of the trusted version of the boot component without re-executing any of the boot components that precede the boot component in the boot sequence.

21. The computing device of claim 19, wherein the processor is configured to output signals to direct the auxiliary circuit to sequentially verify any unexecuted boot components in the boot sequence and selectively replace only the boot components that are unacceptable with trusted copies.

22. The computing device of claim 17, wherein the auxiliary circuit further comprises a communication circuit configured to receive a message from a quality control server indicating that one or more boot components stored on the computing device are infected or corrupt.

23. The computing device of claim 17, wherein the recovery circuit is configured to output a reset signal to the computing device after replacing the boot component with the copy of the trusted version of the boot component.

24. The computing device of claim 17, wherein the infection detection circuit is configured to determine whether the calculated integrity verification value is associated with an acceptable boot component by comparing the calculated integrity verification value with a set of stored values, wherein each stored value corresponds to an acceptable boot component.

25. The computing device of claim 17, wherein the auxiliary circuit is a modified trusted platform module, and wherein the integrity verification value is a digital signature.

26. The computing device of claim 17, wherein, after the infection detection circuit determines that the integrity verification value is not associated with an acceptable boot component, and before the recovery circuit replaces the boot component with a copy of a trusted version of the boot component, the auxiliary circuit provides an indication to a user that the integrity verification value is not associated with an acceptable boot component.

27. The computing device of claim 26, wherein the indication is one of a message on a display, an indicator light, a chime or beep, a voice message, or an e-mail.

28. The computing device of claim 26, wherein the auxiliary circuit receives input from the user directing the auxiliary circuit to replace the boot component with a copy of a trusted version of the boot component.

29. A computing device comprising:

a processor;

a primary storage that stores a boot component;

a trusted storage medium that stores a trusted version of the boot component;

an auxiliary circuit coupled to the processor by a first bus; and a network interface coupled to the auxiliary circuit by a second bus and inaccessible by the processor, wherein the auxiliary circuit comprises:

an integrity verification value calculator circuit configured to calculate an integrity verification value for the boot component of the computing device, wherein the boot component comprises program instructions required for execution by the processor of the computing device to place the computing device into an operating mode;

an infection detection circuit configured to determine whether the integrity verification value is associated with an acceptable boot component; and a recovery circuit configured to replace the boot component with a copy of a trusted version of the boot component when the integrity verification value is not associated with an acceptable boot component, wherein the auxiliary circuit further comprises a communication circuit configured to request and receive the copy of the trusted version of the boot component from a trusted boot component server using the network interface, wherein the trusted boot component server is a network device that stores trusted versions of boot components for the device,
wherein the recovery circuit is configured to replace the boot component with a copy of a trusted version of the boot component by overwriting, with the copy of a trusted version of the boot component received by the communication circuit from the network interface, the boot component in the primary storage.

* * * * *